(12) United States Patent
Lee et al.

(10) Patent No.: US 8,432,930 B2
(45) Date of Patent: Apr. 30, 2013

(54) TRANSMISSION BAND DETERMINATION METHOD FOR BANDWIDTH AGGREGATION SYSTEM

(75) Inventors: Ju Mi Lee, Seoul (KR); Sang Min Lee, Seoul (KR); Yung-Soo Kim, Seongnam-si (KR); Young Ho Jung, Goyang-si (KR)

(73) Assignees: Samsung Electronics Co., Ltd. (KR); University Industry Cooperation Foundation Korea Aerospace University (KR)

( * ) Notice: Subject to any disclaimer, the term of this patent is extended or adjusted under 35 U.S.C. 154(b) by 429 days.

(21) Appl. No.: 12/701,961

(22) Filed: Feb. 8, 2010

(65) Prior Publication Data

US 2010/0202310 A1 Aug. 12, 2010

(30) Foreign Application Priority Data

Feb. 6, 2009 (KR) .................. 10-2009-0009538

(51) Int. Cl.
*H04B 7/212* (2006.01)

(52) U.S. Cl.
USPC ........... 370/444; 370/329; 370/442; 370/443; 455/450; 455/452.1; 455/452.2

(58) Field of Classification Search .................. None
See application file for complete search history.

(56) References Cited

U.S. PATENT DOCUMENTS

| 7,796,605 | B2 * | 9/2010 | Pecen et al. ............... 370/395.21 |
| 8,050,289 | B1 * | 11/2011 | Masterson et al. ............ 370/465 |
| 2003/0032433 | A1 * | 2/2003 | Daniel et al. .................. 455/452 |
| 2004/0157617 | A1 * | 8/2004 | Gorsuch et al. ............ 455/452.2 |
| 2005/0063330 | A1 | 3/2005 | Lee et al. |
| 2007/0291692 | A1 | 12/2007 | Choi et al. |
| 2008/0025317 | A1 | 1/2008 | Pecen et al. |
| 2009/0059790 | A1 * | 3/2009 | Calvert et al. ................. 370/235 |
| 2010/0210272 | A1 * | 8/2010 | Sundstrom et al. ........... 455/450 |
| 2011/0026475 | A1 * | 2/2011 | Lee et al. ...................... 370/329 |
| 2011/0211541 | A1 * | 9/2011 | Yuk et al. ..................... 370/329 |

FOREIGN PATENT DOCUMENTS

| KR | 1020050029112 | 3/2005 |
| KR | 1020080085886 | 9/2008 |
| KR | 1020080088768 | 10/2008 |
| WO | WO 2007/071819 | 6/2007 |

* cited by examiner

*Primary Examiner* — Donald Mills
(74) *Attorney, Agent, or Firm* — The Farrell Law Firm, P.C.

(57) ABSTRACT

A bandwidth aggregation system for providing wideband communication services by aggregating multiple bandwidths and a transmission band determination method for the bandwidth aggregation system are disclosed. T bandwidth determination method includes computing weights of the multiple bandwidths based on resource allocation distributions of the individual bandwidths, and selecting one of the multiple bandwidths for establishing a connection between a base station and a mobile station based on the weights of the multiple bandwidths.

13 Claims, 7 Drawing Sheets

TRANSMISSION BAND DETERMINATION METHOD FOR BANDWIDTH AGGREGATION SYSTEM

PRIORITY

This application claims priority to an application filed in the Korean Patent Office on Feb. 6, 2009 and assigned Serial No. 10-2009-0009538, the contents of which are incorporated herein by reference.

BACKGROUND OF THE INVENTION

1. Field of the Invention

The present invention relates generally to wireless communications and, in particular, to a bandwidth aggregation system for providing wideband communication services by aggregating multiple bandwidths and a transmission band determination method for the bandwidth aggregation system.

2. Description of the Related Art

In order to fulfill the requirements of high speed and different Quality of Service (QoS) classes, $4^{th}$ Generation (4G) communication systems are implemented with enhanced technologies.

$3^{rd}$ Generation Partnership Project (3GPP) Long Term Evolution-Advanced (LTE-A) and Institute of Electrical and Electronics Engineers (IEEE) 802.16m are representative $4^{th}$ generation communication technologies providing a Broadband Wireless Access (BWA) network such as a Local Area Network (LAN) and a Metropolitan Area Network (MAN). Both 3GPP LTE-A and IEEE 802.16m adopt the Orthogonal Frequency Division Multiplex Access (OFDMA) for improved multipath performance.

These next generation communication systems support bandwidth aggregation, with which these communication systems can provide high data rate services and support various QoS classes. In the communication system supporting bandwidth aggregation, a terminal can select at least one of multiple bandwidths to access a base station, which provides the services on the bandwidth selected by terminal.

In the conventional bandwidth aggregation system, however, since the end user terminal selects a bandwidth randomly, the traffic loads of multiple terminals are likely to be concentrated on a single bandwidth. In such a case, the signal collision probability increases, resulting in communication link failure between the mobile station and base station.

SUMMARY OF THE INVENTION

In order to solve the above problems of the prior art, the present invention provides a bandwidth aggregation system for providing wideband communication services by aggregating multiple bandwidths and a transmission band selection method for the bandwidth aggregation system.

In accordance with the present invention, a bandwidth determination method of a base station for a bandwidth aggregation system supporting wideband communication by aggregating multiple bandwidths includes computing weights of the multiple bandwidths based on resource allocation distributions of the individual bandwidths, and selecting one of the multiple bandwidths based on the weights of the multiple bandwidths and establishing a connection with a mobile station using the selected bandwidth. The bandwidth determination method further includes transmitting information on the weights of the multiple bandwidths from the base station to the mobile station through broadcast information or Radio Resource Control (RRC) packets, and adjusting a size of a connection-allowable channel of each bandwidth for receiving a connection request transmitted by the mobile station according to the weight information.

In accordance with the present invention, a bandwidth determination method of a mobile station for a bandwidth aggregation system supporting transmission on aggregated multiple bandwidths includes selecting one of the multiple bandwidths based on weight information indicating weights of the multiple bandwidths that are calculated based on resource allocation distributions of the individual bandwidths, and connecting to a base station through the selected bandwidth.

In accordance with the present invention, a bandwidth determination apparatus of a base station for a bandwidth aggregation system supporting wideband communication by aggregating multiple bandwidths includes a controller which computes weights of the multiple bandwidths based on resource allocation distributions of the individual bandwidths, and a transceiver which establishes a connection with a mobile station using a bandwidth determined by the controller based on the weights of the multiple bandwidths. The controller controls the transceiver to transmit the weight information through broadcast information or RRC packets, and adjusts a size of a connection-allowable channel of each bandwidth for receiving a connection request transmitted by the mobile station according to the weight information.

In accordance with the present invention, a bandwidth determination apparatus of a mobile station for a bandwidth aggregation system supporting wideband communication by aggregating multiple bandwidths includes a transceiver which receives weight information transmitted by a base station, the weight information representing weights calculated based on resource allocation distributions of the multiple bandwidths, and a controller which selects one of the multiple bandwidths based on the weight information and connects the mobile station to the base station through the selected bandwidth.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EMBODIMENTS OF THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted for the sake of clarity and conciseness.

Figure 1:
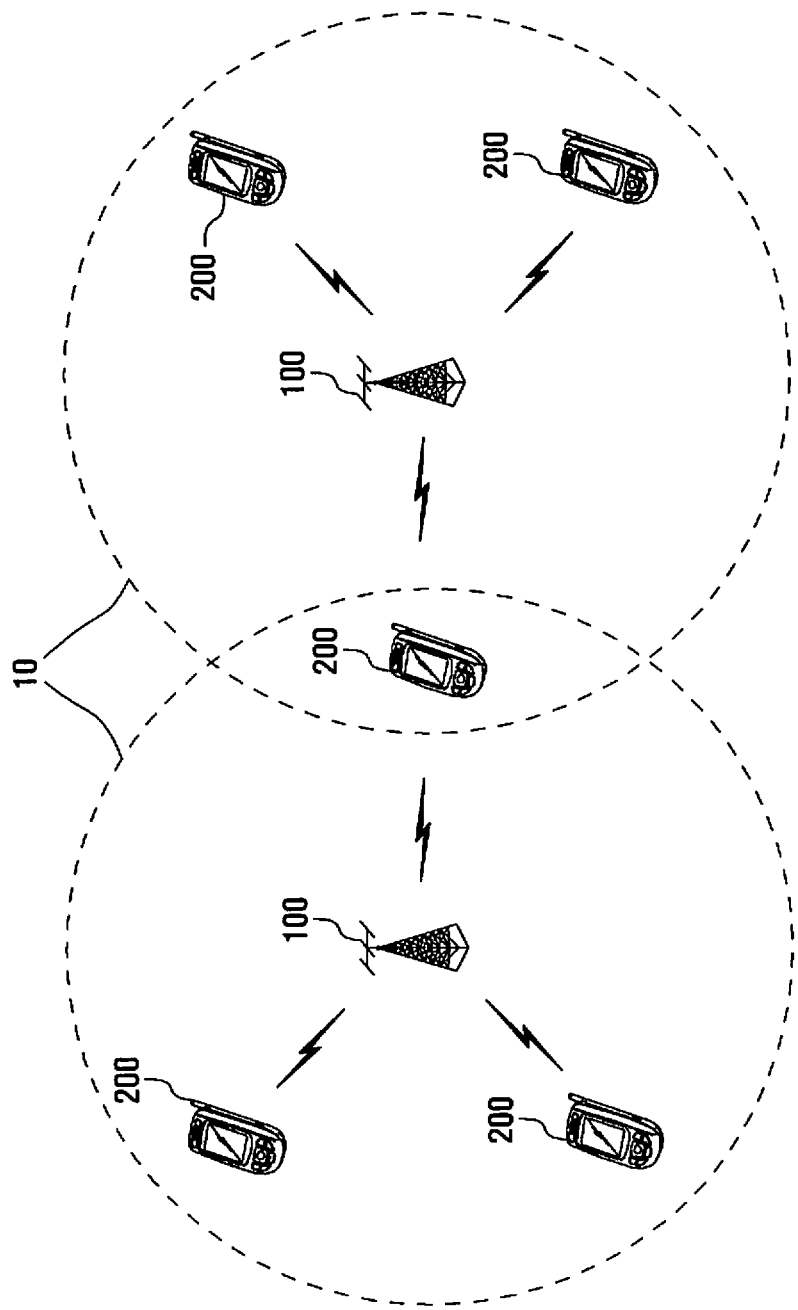
FIG. 1 illustrates a bandwidth aggregation system according to the present invention.

FIG. 1 illustrates a bandwidth aggregation system according to the present invention. The bandwidth aggregation system can be an IEEE 802.16m system or a 3GPP LTE-A system.

As shown in FIG. 1, the bandwidth aggregation system is a cellular system composed of a plurality of cells 10. Each cell is defined by the radio coverage of a base station 100, and mobile stations 200 can migrate across the cells 10 and access the base stations 100. The bandwidth aggregation system allows communication using multiple aggregated bandwidths. For instance, the IEEE 802.16 system supports the broadband communication by aggregating multiple 10 Mhz Frequency Assignments (FAs) of the IEEE 802.16e systems. That is, in a specific cell, the base station 100 and the mobile station 200 can communicate on a wide bandwidth as a result of bandwidth aggregation.

The base station 100 can check the resource allocation distribution of the available bandwidths. For instance, the base station 100 can check a number of mobile stations with which it is communicating per bandwidth. The base station 100 also can determine a weight per bandwidth based on the resource allocation distribution, and select a specific bandwidth for establishing a communication link with the mobile station base on the weight. Individual bandwidths have respective available connection channels for the connection between the base station 100 and the mobile station 200 so as to maintain resource allocation distribution uniformly over the bandwidths.

Figure 2:
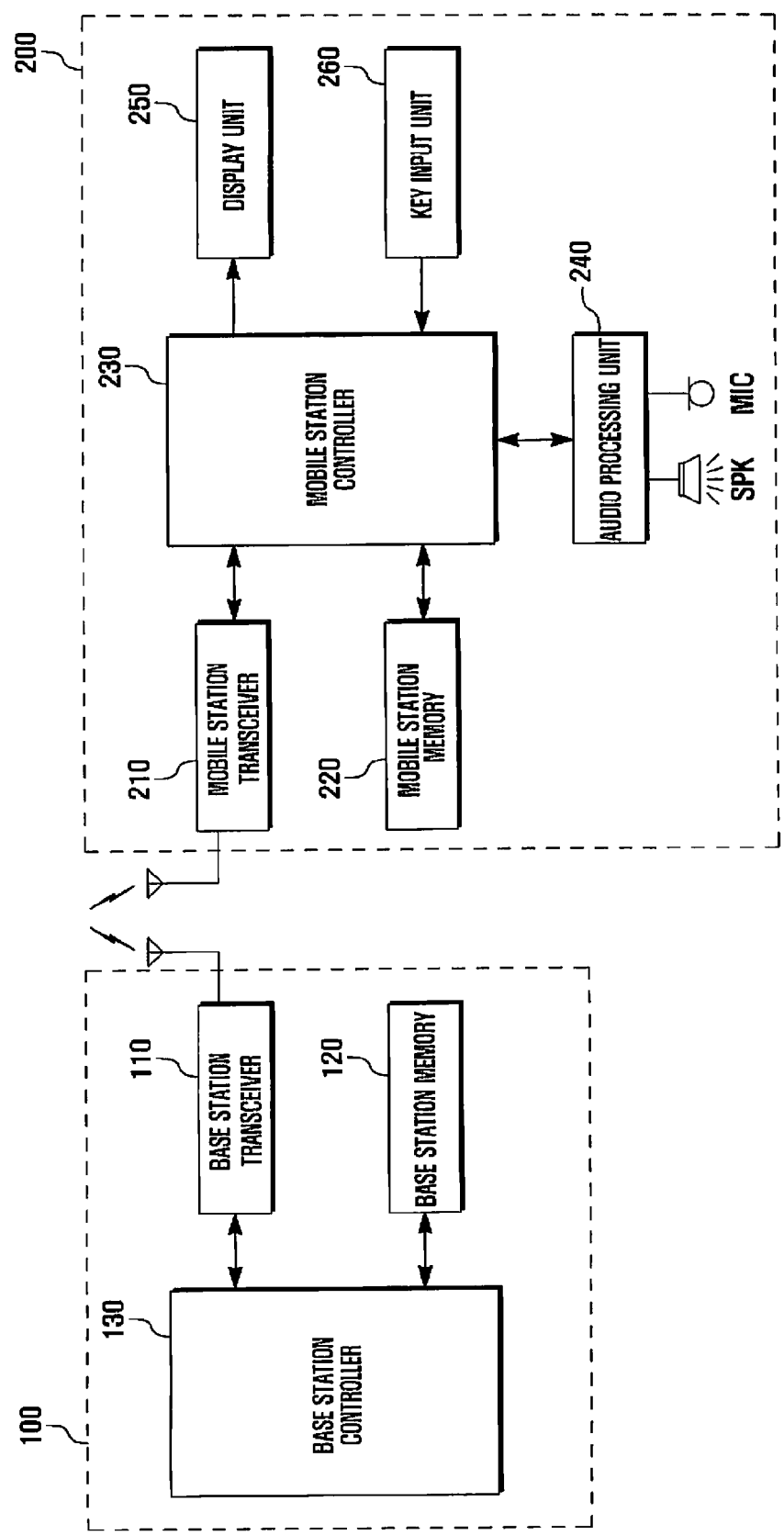
FIG. 2 illustrates configurations of the base station and the mobile station of a bandwidth aggregation system according to the present invention.

FIG. 2 illustrates configurations of the base station and the mobile station of a bandwidth aggregation system according to the present invention. The description is made under the assumption that the mobile station is a mobile phone.

As shown in FIG. 2, the bandwidth aggregation system includes a base station 100 defining a cell and a mobile station 200 served by the base station 100 within the cell.

The base station 100 includes a base station transceiver 110, a base station memory 120, and a base station controller 130.

The base station transceiver 110 is responsible for the communication function of the base station, and includes a transmitter for up-converting and amplifying the transmission signal and a receiver for low noise amplifying and down-converting the received signal.

The base station memory 120 can be divided into a program memory and a data memory. The program memory stores application programs related to the operations of the base station 100. Particularly, the program memory stores the programs related to the bandwidth aggregation and management of the resources of the bandwidths. The data memory stores the data generated while the application programs are running.

The base station controller 130 controls overall operations of the base station 100, and includes a data processor having a transmitter for encoding and modulation of the transmission signal and a receiver for demodulating and decoding the received signal. Here, the data processing unit can be provided with a modem and a codec. The codec can include a data codec for processing packet data and an audio codec for processing an audio signal including voice.

In the present invention, the base station controller 130 can control the aggregation of multiple bandwidths. The base station controller 130 also analyzes the resource allocation distribution of the bandwidths and generates the weight information of the bandwidths, broadcasts the weight information on the Broadcast CHannel (BCH), and changes the size of access channel for the mobile station 200 to access.

The mobile station 200 includes a mobile station transceiver 210, a mobile station memory 220, a mobile station controller 230, an audio processing unit 240, a display unit 250, and a key input unit 260.

The mobile station transceiver 210 is responsible for communication of the mobile station 200, and includes a transmitter for up-converting and amplifying the transmission signal and a receiver for low noise amplifying and down-converting the received signal.

The mobile station memory 220 can be divided into a program memory and a data memory. The program memory stores programs for controlling operations of the mobile station 200. Particularly, the program memory stores the programs for aggregating bandwidths and selecting at least one of multiple bandwidths. The data memory stores data generated while the programs are running in the mobile station.

The mobile station controller 230 controls overall operations of the mobile station 200, and includes a data processing unit having a transmitter for encoding and modulating the transmission signal and a receiver for demodulating and decoding the received signal. The data processing unit can include a modem and a codec. The codec includes a data codec for processing packet data and an audio codec for processing the audio signal including voice. The mobile station controller 230 controls such that the mobile station can access the base station 100 using at least one of multiple bandwidths. The mobile station controller 230 selects the bandwidth based on the weight information.

The audio processing unit 240 is responsible for processing the audio signal input by the audio codec so as to be output through a SPeaKer (SPK) as an audible sound and processing the sound wave input by a microphone so as to be output to the audio codec as an audio signal.

The display unit 250 displays video data input by the mobile station controller 230. The display unit 250 can be implemented with a Liquid Crystal Display (LCD). In this case, the display unit 250 includes an LCD controller, a video memory, and LCD devices. When the LCD supports the touchscreen function, the display unit can be configured as an input unit.

The key input unit 260 is provided with a plurality of alphanumeric keys and various function keys.

Figure 3:
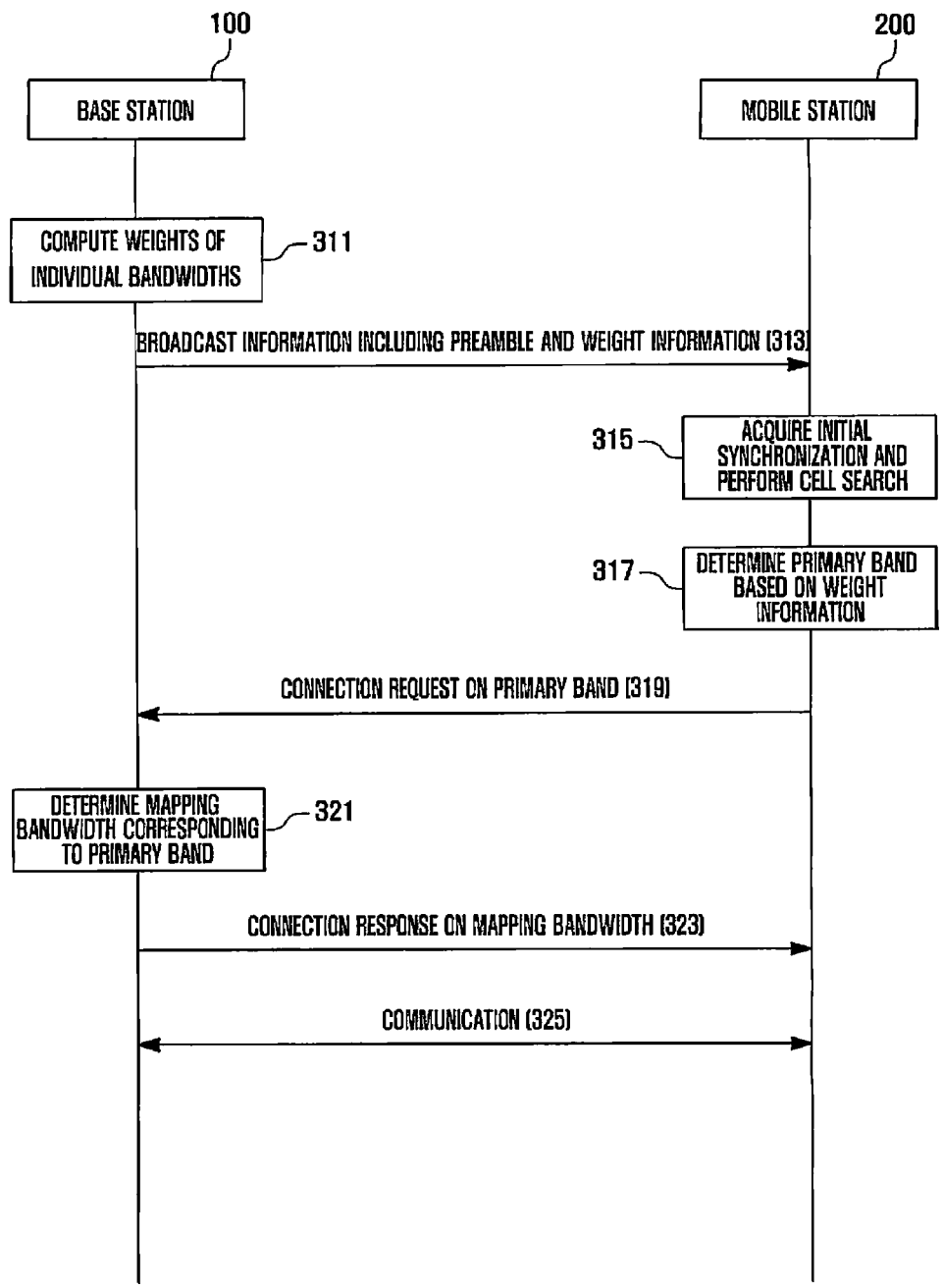
FIG. 3 illustrates operations of a base station and a mobile station for selecting a bandwidth in a bandwidth aggregation system according to the present invention.

FIG. 3 illustrates operations of a base station and a mobile station for selecting a bandwidth in a bandwidth aggregation system according to the present invention.

Referring to FIG. 3, the base station 100 first determines the weights of the individual bandwidths at step 311. The weights of the bandwidths are used to aggregate the bandwidths. Once the weights of the bandwidths have been determined, the base station 100 checks the resource allocation distribution over the bandwidths and generates weight information per bandwidth. Here, the base station can retrieve the weight vector indices matched to the weights and previously stored. The weight vector indices are stored within the base station memory 120 as a weight vector table as shown in Tables 1 and 2. Table 1 shows weights of the two bandwidths that are mapped to the individual weight vector indices, and Table 2 shows weights of the three bandwidths that are mapped to the individual weight vectors.

TABLE 1

| Vector index | Band 1 | Band 2 |
|---|---|---|
| 00000 | 0 | 1 |
| 00001 | 1/30 | 29/30 |
| 00010 | 2/30 | 28/30 |
| 00011 | 3/30 | 27/30 |
| 00100 | 4/30 | 26/30 |
| 00101 | 5/30 | 25/30 |
| 00110 | 6/30 | 24/30 |
| 00111 | 7/30 | 23/30 |
| 01000 | 8/30 | 22/30 |
| 01001 | 9/30 | 21/30 |
| 01010 | 10/30 | 20/30 |
| 01011 | 11/30 | 19/30 |
| 01100 | 12/30 | 18/30 |
| 01101 | 13/30 | 17/30 |
| 01110 | 14/30 | 16/30 |
| 01111 | 15/30 | 15/30 |
| 10000 | 16/30 | 14/30 |
| 10001 | 17/30 | 13/30 |
| 10010 | 18/30 | 12/30 |
| 10011 | 19/30 | 11/30 |
| 10100 | 20/30 | 10/30 |
| 10101 | 21/30 | 9/30 |
| 10110 | 22/30 | 8/30 |
| 10111 | 23/30 | 7/30 |
| 11000 | 24/30 | 6/30 |
| 11001 | 25/30 | 5/30 |
| 11010 | 26/30 | 4/30 |
| 11011 | 27/30 | 3/30 |
| 11100 | 28/30 | 2/30 |
| 11101 | 29/30 | 1/30 |
| 11110 | 30/30 | 0 |
| 11111 | 0 | 0 |

TABLE 2

| Vector | Band 1 | Band 2 | Band 3 |
|---|---|---|---|
| 00000 | 0 | 0 | 0 |
| 00001 | 1 | 0 | 0 |
| 00010 | 0 | 1 | 0 |
| 00011 | 0 | 0 | 1 |
| 00100 | 0.33 | 0.33 | 0.33 |
| 00101 | 0 | 1/6 | 5/6 |
| 00110 | 0 | 2/6 | 4/6 |
| 00111 | 0 | 3/6 | 3/6 |
| 01000 | 0 | 4/6 | 2/6 |
| 01001 | 0 | 5/6 | 1/6 |
| 01010 | 1/6 | 0 | 5/6 |
| 01011 | 1/6 | 1/6 | 4/6 |
| 01100 | 1/6 | 2/6 | 3/6 |
| 01101 | 1/6 | 3/6 | 2/6 |
| 01110 | 1/6 | 4/6 | 1/6 |
| 01111 | 1/6 | 5/6 | 0 |
| 10000 | 2/6 | 0 | 4/6 |
| 10001 | 2/6 | 1/6 | 3/6 |
| 10010 | 2/6 | 2/6 | 2/6 |
| 10011 | 2/6 | 3/6 | 1/6 |
| 10100 | 2/6 | 4/6 | 0 |
| 10101 | 3/6 | 0 | 3/6 |
| 10110 | 3/6 | 1/6 | 2/6 |
| 10111 | 3/6 | 2/6 | 1/6 |
| 11000 | 3/6 | 3/6 | 0 |
| 11001 | 4/6 | 0 | 2/6 |
| 11010 | 4/6 | 1/6 | 1/6 |
| 11011 | 4/6 | 2/6 | 0 |
| 11100 | 5/6 | 0 | 1/6 |
| 11101 | 5/6 | 1/6 | 0 |
| 11110 | reserved | reserved | reserved |
| 11111 | reserved | reserved | reserved |

For instance, if two bandwidths (Band 1 and Band 2) are aggregated and their weights are 5/30 and 25/30 respectively, the base station 100 retrieves the weight index '00101' matched to weights of the two bandwidths from Table 1. Also, if three bandwidths (Band 1, Band 2, and Band 3) are aggregated and their weights are 0, 1/6, and 5/6 respectively, the base station 100 retrieves the weight index '00101' matched to the weights of the three bandwidths from Table 2.

Next, the base station 100 transmits a preamble and broadcast information on a broadcast channel at step 313. Here, the broadcast information can be the system information (System Information Block (SIB)) including available bandwidths of the base station 100, resource allocation structure per bandwidth, and weight information per bandwidth. The preamble can include the weight indices mapped to the weights per bandwidth.

The base station 100 can transmit the aggregation band bitmap representing the bandwidth information and weight indices in series. Specifically, if the two bands (Band 1 and Band 2) are aggregated and the weights of the Band 1 and Band 2 are 5/30 and 25/30 respectively, the base station 100 transmits the broadcast information of '0101 00101'. Also, if the three bands (Band 1, Band 2, and Band 3) are aggregated and the weights of these bands are 0, 1/6, and 5/6 respectively, the base station 100 transmits the broadcast information of '0111 00101'.

If the preamble and broadcast information have been received, the mobile station 200 acquires initial synchronization using the preamble and performs cell search to find a base station to camp on at step 315. The mobile station 200 also checks the bandwidth information, resource allocation structure, and weight information, and checks the weight index carried in the broadcast information and the previously stored weigh information matched to the weight index. The weight information can be stored within the mobile station memory 220 as a weight vector table as shown in Tables 3 and 4. Table 3 shows weights of the two bandwidths that are mapped to the individual weight vector indices when two bandwidths are aggregated, and Table 4 shows weights of the three bandwidths that are mapped to the individual weight vectors when three bandwidths are aggregated.

TABLE 3

| Vector index | Band 1 | Band 2 |
|---|---|---|
| 00000 | 0 | 1 |
| 00001 | 1/30 | 29/30 |
| 00010 | 2/30 | 28/30 |
| 00011 | 3/30 | 27/30 |
| 00100 | 4/30 | 26/30 |
| 00101 | 5/30 | 25/30 |
| 00110 | 6/30 | 24/30 |
| 00111 | 7/30 | 23/30 |
| 01000 | 8/30 | 22/30 |
| 01001 | 9/30 | 21/30 |
| 01010 | 10/30 | 20/30 |
| 01011 | 11/30 | 19/30 |
| 01100 | 12/30 | 18/30 |
| 01101 | 13/30 | 17/30 |
| 01110 | 14/30 | 16/30 |
| 01111 | 15/30 | 15/30 |
| 10000 | 16/30 | 14/30 |
| 10001 | 17/30 | 13/30 |
| 10010 | 18/30 | 12/30 |
| 10011 | 19/30 | 11/30 |
| 10100 | 20/30 | 10/30 |
| 10101 | 21/30 | 9/30 |
| 10110 | 22/30 | 8/30 |
| 10111 | 23/30 | 7/30 |
| 11000 | 24/30 | 6/30 |
| 11001 | 25/30 | 5/30 |
| 11010 | 26/30 | 4/30 |
| 11011 | 27/30 | 3/30 |

TABLE 3-continued

| Vector index | Band 1 | Band 2 |
|---|---|---|
| 11100 | 28/30 | 2/30 |
| 11101 | 29/30 | 1/30 |
| 11110 | 30/30 | 0 |
| 11111 | 0 | 0 |

TABLE 4

| Vector | Band 1 | Band 2 | Band 3 |
|---|---|---|---|
| 00000 | 0 | 0 | 0 |
| 00001 | 1 | 0 | 0 |
| 00010 | 0 | 1 | 0 |
| 00011 | 0 | 0 | 1 |
| 00100 | 0.33 | 0.33 | 0.33 |
| 00101 | 0 | 1/6 | 5/6 |
| 00110 | 0 | 2/6 | 4/6 |
| 00111 | 0 | 3/6 | 3/6 |
| 01000 | 0 | 4/6 | 2/6 |
| 01001 | 0 | 5/6 | 1/6 |
| 01010 | 1/6 | 0 | 5/6 |
| 01011 | 1/6 | 1/6 | 4/6 |
| 01100 | 1/6 | 2/6 | 3/6 |
| 01101 | 1/6 | 3/6 | 2/6 |
| 01110 | 1/6 | 4/6 | 1/6 |
| 01111 | 1/6 | 5/6 | 0 |
| 10000 | 2/6 | 0 | 4/6 |
| 10001 | 2/6 | 1/6 | 3/6 |
| 10010 | 2/6 | 2/6 | 2/6 |
| 10011 | 2/6 | 3/6 | 1/6 |
| 10100 | 2/6 | 4/6 | 0 |
| 10101 | 3/6 | 0 | 3/6 |
| 10110 | 3/6 | 1/6 | 2/6 |
| 10111 | 3/6 | 2/6 | 1/6 |
| 11000 | 3/6 | 3/6 | 0 |
| 11001 | 4/6 | 0 | 2/6 |
| 11010 | 4/6 | 1/6 | 1/6 |
| 11011 | 4/6 | 2/6 | 0 |
| 11100 | 5/6 | 0 | 1/6 |
| 11101 | 5/6 | 1/6 | 0 |
| 11110 | reserved | reserved | reserved |
| 11111 | reserved | reserved | reserved |

Specifically, if the bandwidth information and weight index contained in the broadcast information is represented by '0101 00101', the mobile station 200 recognizes that the two bandwidths (Band 1 and Band 2) are aggregated and Band 1 and Band 2 have the respective weights of 5/30 and 25/30. Also, if the bandwidth information and weight index contained in the broadcast information is represented by '0101 00101 ', the mobile station 200 recognizes that the three bandwidths (Band 1, Band 2, and Band 3) are aggregated and these bands have the respective weights of 0, 1/6, and 5/6.

The mobile station 200 then selects one of the aggregated bandwidths as a primary band for connecting to the base station 10 based on the weight information in step 317. Here, the mobile station 200 can selects a value in the range from 0 to 1 to select the primary band.

For instance, if two bandwidths (Band 1 and Band 2) are aggregated, and the weights of these bands are 5/30 and 25/30 respectively, the mobile station 200 divides the range from 0 to 1 into the region of the values from 0 to 5/30 and the region of the values from 5/30 to 1. The mobile station randomly selects one of the values in the range from 0 to 1. If the selected value has been in the range from 0 to 5/30, the mobile station 200 selects the first bandwidth (Band 1) as the primary band. Otherwise, if the selected value has been in the range from 5/30 to 1, the mobile station 200 selects the second bandwidth (Band 2) as the primary band.

Once the primary band has been selected, the mobile station 200 transmits a connection request message to the base station 100 to request for the connection to the base station on the primary band in step 319. The mobile station 200 can register with the base station 100 and request the base station 100 to allocate a Connection IDentifier (CID). In the IEEE 802.16m system, the mobile station 200 requests the connection for the initial ranging. In the 3GPP LTE-A system, the mobile station requests the connection for the random access.

If the connection request message has been received, the base station 100 determines a mapping bandwidth to the primary band indicated by the connection request message in step 321, and transmits a connection response message to the mobile station 200 on the bandwidth mapped to the primary band in step 323. In the IEEE 802.16m system, the connection response message is the ranging response message. In the 3GPP LTE-A system, the connection response message is the random access response message.

If the connection response message has been received in response to the connection request message, the mobile station 200 can communicate with the base station at step 325. The mobile station 200 transmits signals to the base station 100 on the primary band and receives the signal transmitted by the base station 100 on the mapping bandwidth. Also, the base station 100 receives the signal transmitted by the mobile station 200 on the primary band and transmits the signal to the mobile station 200 on the mapping bandwidth. In the IEEE 802.16m system, the mobile station 200 can transmit a bandwidth request message to the base station 100. In the 3GPP LTE-A system, the mobile station 200 can transmit a scheduling request message to the base station 100.

Although it is depicted that the base station 100 transmits the weight index to the mobile station 200 in the embodiment of FIG. 3, the present invention is not limited thereto. For instance, the base station 100 and the mobile station 200 can exchange the weight information through PHYsical (PHY) lay signaling. In this case, the base station 100 and the mobile station 200 are not needed to store the weight vector tables.

Figure 4:
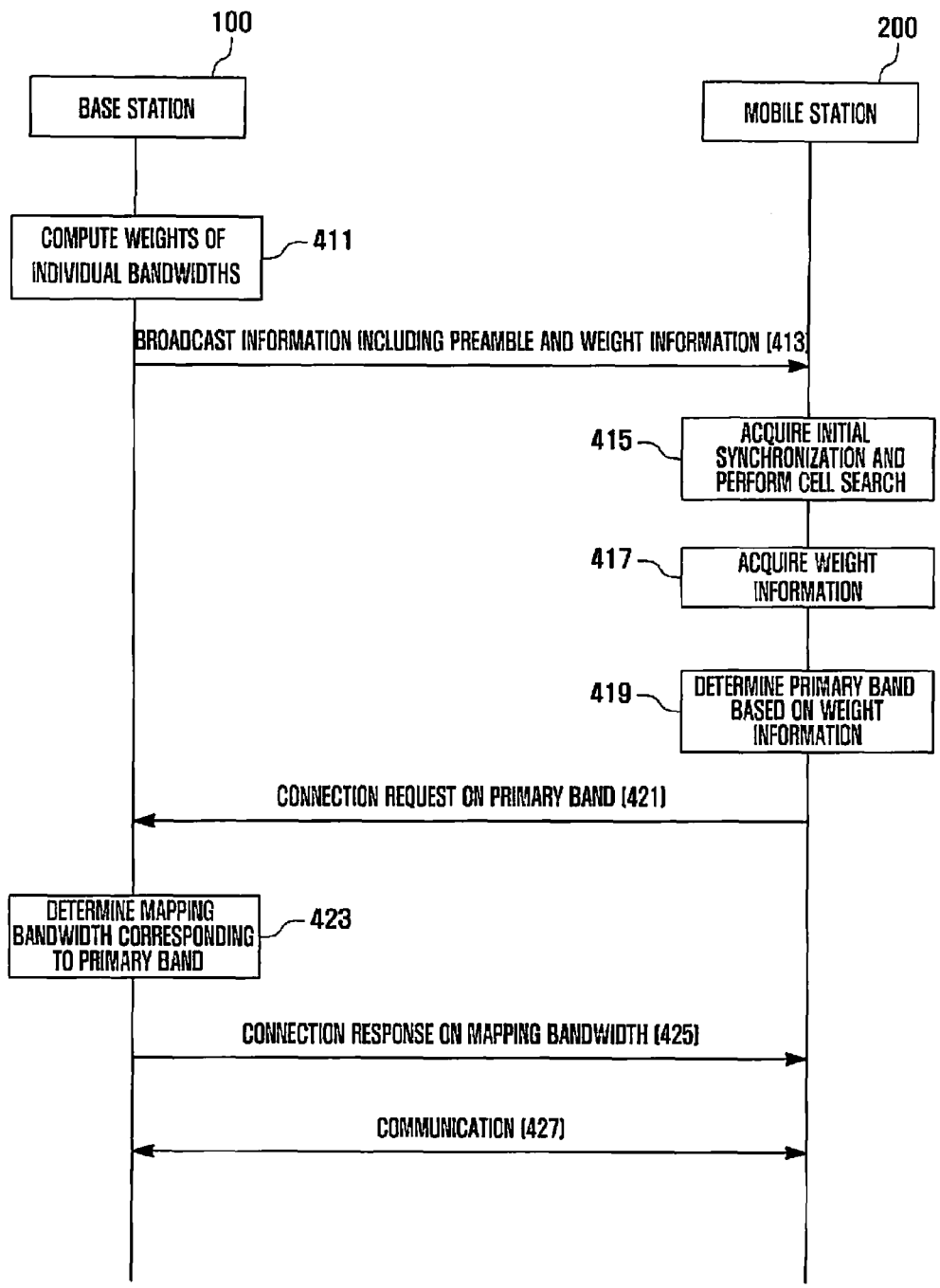
FIG. 4 illustrates operations of a base station and a mobile station for determining a transmission bandwidth in a bandwidth aggregation system according to a first embodiment of the present invention.
Figure 5:
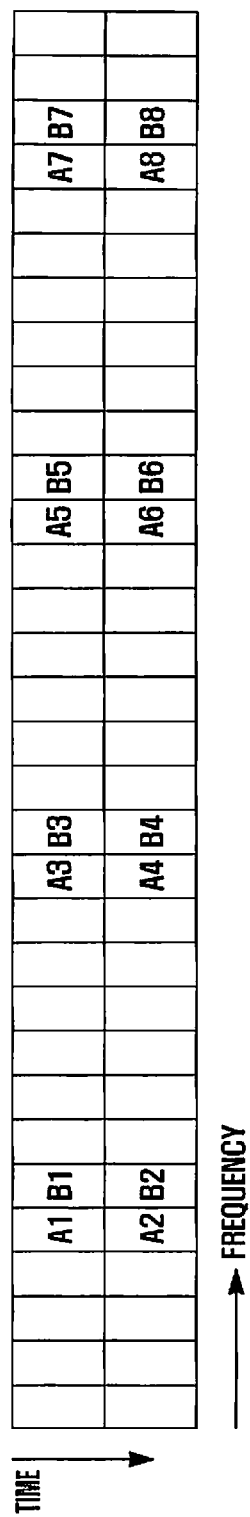
FIG. 5 illustrates a physical layer signaling for the bandwidth determination method of FIG. 4.

FIG. 4 illustrates operations of a base station and a mobile station for determining a transmission bandwidth in a bandwidth aggregation system according to a first embodiment of the present invention, and FIG. 5 illustrates a physical layer signaling for the bandwidth determination method of FIG. 4.

Referring to FIG. 4, the base station 100 first determines the weights of the available bandwidths in step 411. At this time, the base station determines the bandwidths to be aggregated and checks the resource allocation distributions and weights of the individual bandwidths.

Next, the base station 100 transmits a preamble and broadcast information on the broadcast channel. The broadcast information can be the system information including the bandwidth information and resource allocation structure of the bandwidths supported by the base station 100. The base station 100 transmits the broadcast information using the weight information. The weight information is converted to an analog signal and then transmitted on the broadcast channel. That is, the base station 100 transmits the broadcast information as an the analog signal at a transmission power level corresponding to the weights of the individual bandwidths. The base station 100 transmits the analog signal on the channel allocated at a predetermined position as shown in FIG. 5.

For instance, when two bandwidths are aggregated, the base station 100 transmits the analog signal representing the weight information of the first transmission band on the resources A1, A2, A3, A4, A5, A6, A7, and A8 as shown in FIG. 5. Also, the base station 100 transmits the analog signal representing the weight information of the second transmission band on the resources B1, B2, B3, B4, B5, B6, B7, and B8.

If the preamble and broadcast information have been received, the mobile station 200 acquires the initial synchronization using the preamble in step 415. At this time, the mobile station 200 performs cell search to find a base station to camp on and checks the bandwidth information and resource allocation structure. The mobile station 200 acquires the weight information by analyzing the analog signal based on the location of the broadcast channel and calculating the weights of the bandwidths in step 417. For instance, the mobile stations compares the number of bandwidths aggregated and received signal strengths of the analog signal on the transmission bandwidths so as to acquire the weight information of the individual transmission bandwidths. When two bandwidths are aggregated, the mobile station 200 calculates the weights of the first and second transmission bandwidths using Equation (1) as follows:

$$\hat{W}_1 = \frac{r}{1+r}, \hat{W}_2 = \frac{1}{1+r} \quad (1)$$

where $\hat{W}_1$ denotes the weight of the first transmission bandwidth, $\hat{W}_2$ denotes the weight of the second transmission bandwidth, and r denotes the ratio between weights of the first and second transmission bandwidths. r is calculated as shown in Equation (2):

$$r_1 = \left|\frac{(Y_{A1} + Y_{A2})}{(Y_{B1} + Y_{B2})}\right|,$$
$$r_2 = \left|\frac{(Y_{A3} + Y_{A4})}{(Y_{B3} + Y_{B4})}\right|,$$
$$r_3 = \left|\frac{(Y_{A5} + Y_{A6})}{(Y_{B5} + Y_{B6})}\right|, \quad (2)$$
$$r_4 = \left|\frac{(Y_{A7} + Y_{A8})}{(Y_{B7} + Y_{B8})}\right|,$$
$$r = \frac{r_1 + r_2 + r_3 + r_4}{4}$$

where Y is the received signal strength of the analog signal.

Next, the mobile station 230 selects one of the multiple bandwidths as the primary band for connecting to the base station based on the weight information in step 419. At this time, the mobile station 200 divides the range from 0 to 1 into the regions corresponding to the weights and generates one of the values in the range from 0 to 1 to select the primary band.

For instance, if two bandwidths (Band 1 and Band 2) are aggregated and the weights of Band 1 and Band 2 are 5/30 and 25/30 respectively, the mobile station 200 divides the range from 0 to 1 into the region of the values from 0 to 5/30 and the region of the values from 5/30 to 1. The mobile station 200 randomly selects one of the values in the range from 0 to 1 If the selected value has been in the range from 0 to 5/30, the mobile station 200 selects the first bandwidth (Band 1) as the primary band. Otherwise, if the selected value has been in the range from 5/30 to 1, the mobile station 200 selects the second bandwidth (Band 2) as the primary band.

Once the primary band has been selected, the mobile station 200 transmits a connection request message to the base station 100 to request for the connection to the base station 100 through the connection-allowable channel in the primary band in step 421. The mobile station 200 can register with the base station 100 and request the base station 100 to allocate a Connection IDentifier (CID). In the IEEE 802.16m system, the mobile station 200 requests the connection for the initial ranging. In the 3GPP LTE-A system, the mobile station requests the connection for the random access.

If the connection request message has been received, the base station 100 determines a mapping bandwidth to the primary band indicated by the connection request message in step 423 and transmits a connection response message to the mobile station 200 on the bandwidth mapped to the primary band in step 425. In the IEEE 802.16m system, the connection response message is the ranging response message. In the 3GPP LTE-A system, the connection response message is the random access response message.

If the connection response message has been received in response to the connection request message, the mobile station 200 can communicate with the base station in step 427. The mobile station 200 transmits signals to the base station 100 on the primary band and receives the signal transmitted by the base station 100 on the mapping bandwidth. Also, the base station 100 receives the signal transmitted by the mobile station 200 on the primary band and transmits the signal to the mobile station 200 on the mapping bandwidth. In the IEEE 802.16m system, the mobile station 200 can transmit a bandwidth request message to the base station 100. In the 3GPP LTE-A system, the mobile station 200 can transmit a scheduling request message to the base station 100.

Although it is detected that the mobile station 200 selects the primary band based on the weight information transmitted by the base station 100 in the embodiment of FIG. 4, the present invention is not limited thereto. For instance, the base station 100 can be configured to manage the available bandwidths such that the resources are allocated uniformly on the multiple bandwidths even when the mobile station 200 selects the primary band randomly.

Figure 6:
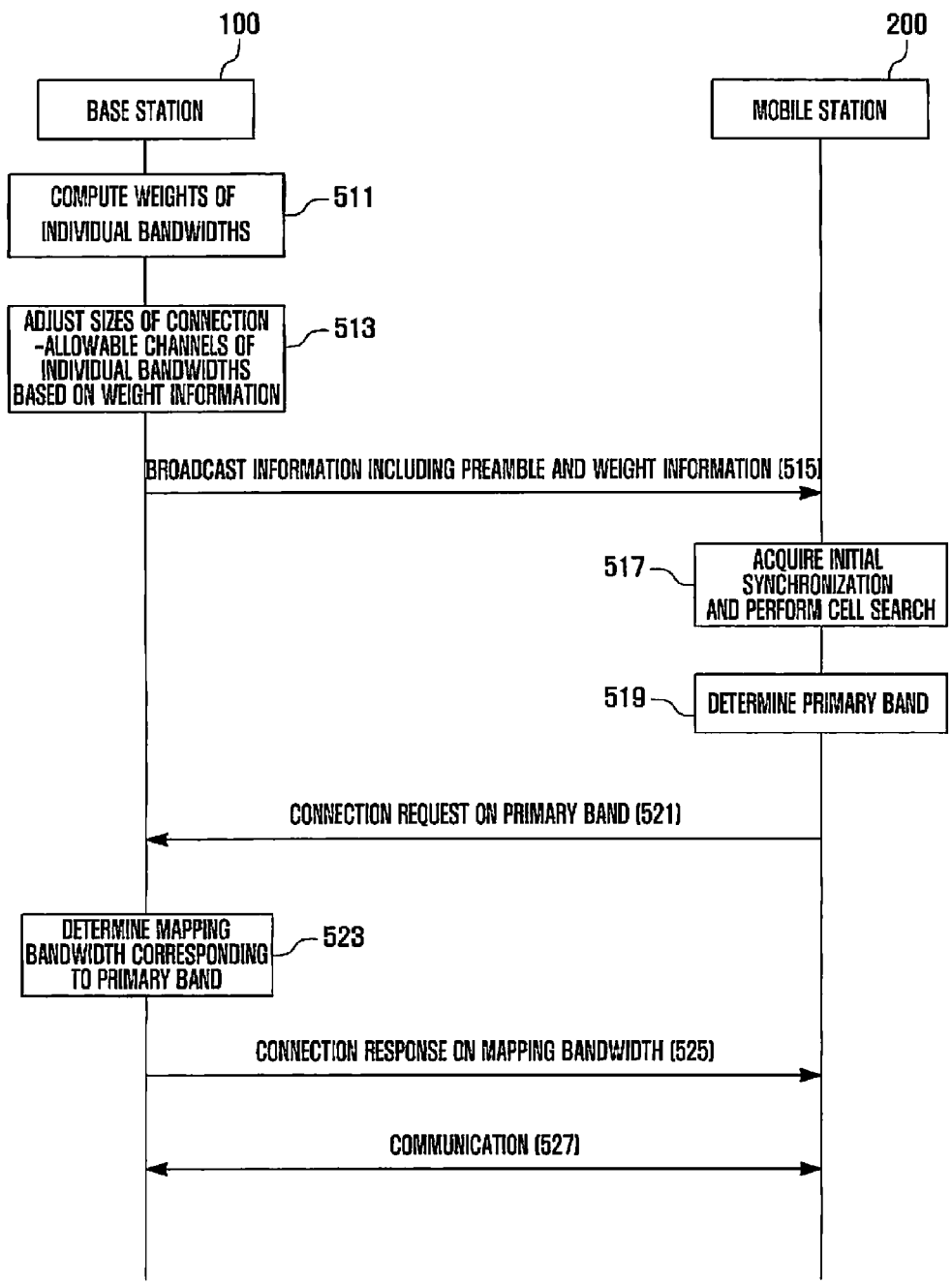
FIG. 6 illustrates operations of a base station and a mobile station for determining a transmission bandwidth in a bandwidth aggregation system according to a second embodiment of the present invention.

FIG. 6 illustrates operations of a base station and a mobile station for determining a transmission bandwidth in a bandwidth aggregation system according to a second embodiment of the present invention.

Referring to FIG. 6, the base station 100 first determines the weights of the available bandwidths in step 511. The base station determines the bandwidths to be aggregated and checks the resource allocation distributions of and weights of the individual bandwidths.

Next, the base station 100 adjusts the sizes of the connection-allowable channels of the individual transmission bands based on the weight information for the connection between the base station 100 and the mobile station 200 in step 513. That is, the base station 200 adjusts the sizes of the connection-allowable channels in the individual transmission bands so as to maintain the weights of the transmission bands in similar level. The base station transmits a preamble and broadcast information on the broadcast channel in step 515. Here, the broadcast information can be the system information including the bandwidth information and resource allocation structure of the bandwidths supported by the base station 100. The broadcast information can further include the sizes of the connection-allowable channels of the individual transmission bands.

If the preamble and broadcast information has been received, the mobile station 200 acquires initial synchronization using the preamble in step 517. The mobile station performs cell search to find a base station to camp on. At this time, the mobile station 200 checks the bandwidth information and resource allocation structure.

Next, the mobile station selects one of the multiple bandwidths as the primary band for connecting to the base station based on the weight information in step 519. The mobile station 200 divides the range from 0 to 1 into the regions corresponding to the weights and generates one of the values in the range from 0 to 1 to select the primary band.

Once the primary band has been selected, the mobile station 200 transmits a connection request message to the base station 100 to request for the connection to the base station 100 through the connection-allowable channel in the primary band in step 521). The mobile station 200 can register with the base station 100 and request the base station 100 to allocate a CID. In the IEEE 802.16m system, the mobile station 200 requests the connection for the initial ranging. In the 3GPP LTE-A system, the mobile station requests the connection for the random access.

If the connection request message has been received, the base station 100 determines a bandwidth to be mapped with the primary band indicated by the connection request message in step 523 and transmits a connection response message to the mobile station 200 on the bandwidth mapped to the primary band in step 525. In the IEEE 802.16m system, the connection response message is the ranging response message. In the 3GPP LTE-A system, the connection response message is the random access response message.

If the connection response message has been received in response to the connection request message, the mobile station 200 can communicate with the base station in step 427. The mobile station 200 transmits signals to the base station 100 on the primary band and receives the signal transmitted by the base station 100 on the mapping bandwidth. Also, the base station 100 receives the signal transmitted by the mobile station 200 on the primary band and transmits the signal to the mobile station 200 on the mapping bandwidth. In the IEEE 802.16m system, the mobile station 200 can transmit a bandwidth request message to the base station 100. In the 3GPP LTE-A system, the mobile station 200 can transmit a scheduling request message to the base station 100.

Although it is depicted that the base station 100 and the mobile station 200 exchange signals through the primary band in the second embodiment of FIG. 6, the present invention is not limited thereto. For instance, the base station 100 can be configured to manage the available bandwidths such that the resources are allocated uniformly on the multiple bandwidths even when the mobile station 200 selects the primary band randomly. After connecting to the base station 100 through the primary band, the mobile station 200 can change the primary band to communicate with the base station 100.

Figure 7:
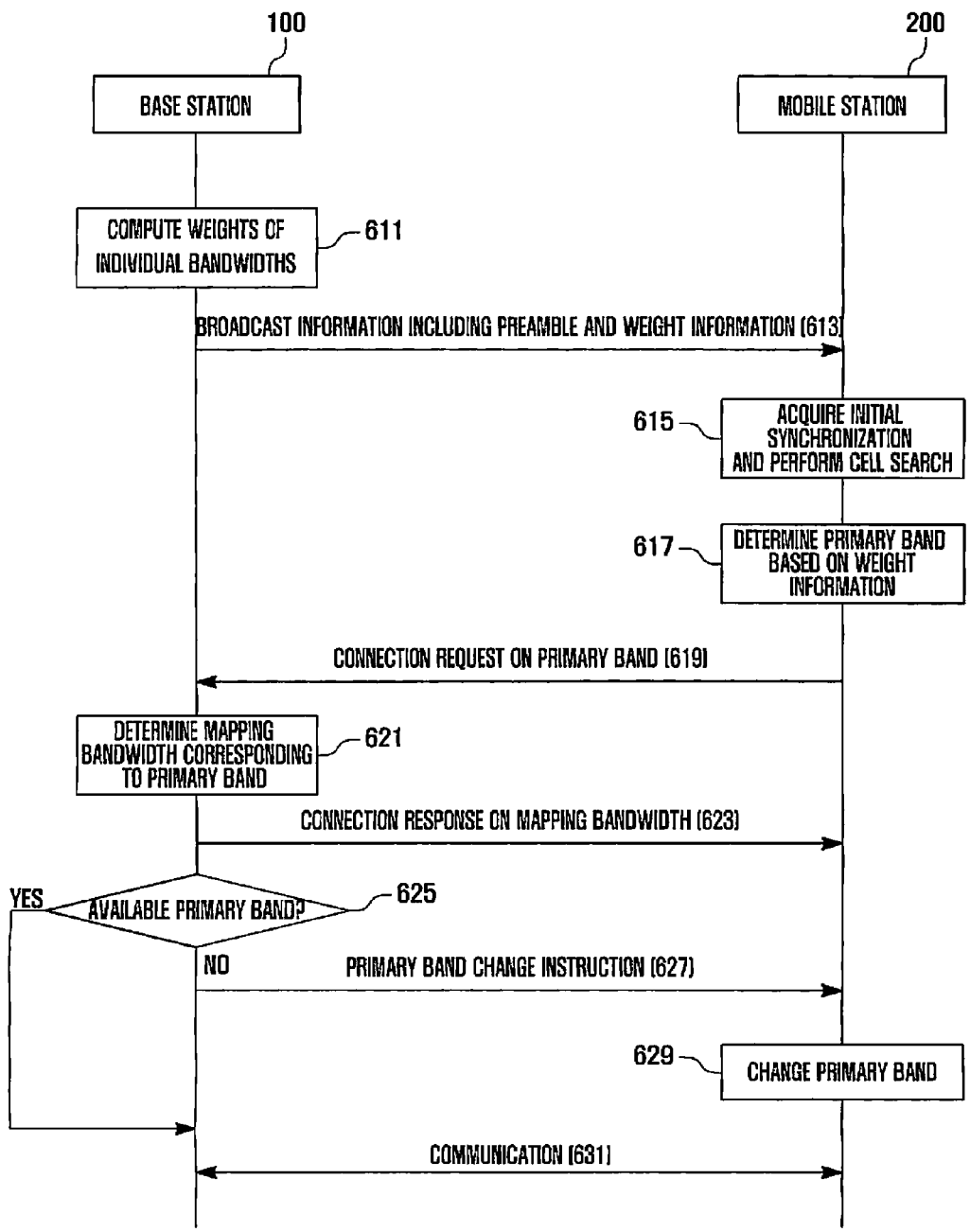
FIG. 7 illustrates operations of a base station and a mobile station for determining a transmission bandwidth in a bandwidth aggregation system according to a third embodiment of the present invention.

FIG. 7 illustrates operations of a base station and a mobile station for determining a transmission bandwidth in a bandwidth aggregation system according to a third embodiment of the present invention.

Since steps 611 to 623 of the transmission bandwidth determination procedure of the FIG. 7 are identical to steps 311 to 323 of FIG. 3, detailed descriptions thereon are omitted herein for the sake of conciseness. In the embodiment of FIG. 7, after transmitting the connection response message to the mobile station 200 on the mapping bandwidth at step 623, the base station 100 determines whether the primary band requested by the mobile station 200 is available for the communication between the base station 100 and the mobile station 200 in step 625. That is, the base station 100 determines whether the primary band is available, based on the resource allocation distribution of the primary band.

If it has been determined that the primary band is available at step 625, the base station 100 performs communication with the mobile station 200 through the primary band in step 631. The base station 100 receives the signal transmitted by the mobile station 200 on the primary band and transmits the signal on the bandwidth mapped to the primary band. Also, the mobile station 200 transmits the signal on the primary band and receives the signal transmitted by the base station on the bandwidth mapped to the primary band. In the 3GPP LTE-A system, the mobile station 200 can transmit a scheduling request message to the base station 100.

If it has been determined that the primary band is not available at step 625, the base station 100 transmits a primary band change instruction message to the mobile station in step 627. The primary band change instruction message is transmitted on the bandwidth mapped to the primary band requested by the mobile station 200. If the primary band change instruction message has been received, the mobile station 200 changes the primary band to a bandwidth different from the previously requested one in step 629. The mobile station performs communication with the base station 100 through the changed primary band in step 631. In the IEEE 802.16m system, the mobile station 200 can transmit a data transmission capacity request message to the base station 100. In the 3GPP LTE-A system, the mobile station can transmit a scheduling request message to the base station 100.

Although it is depicted that the primary band change instruction message is transmitted after the transmission of the connection response message in the third embodiment of FIG. 7, the present invention is not limited thereto. For instance, the base station 100 can be configured to verify the availability of the primary band immediately after the determination of the mapping bandwidth to the primary band and transmit, if it has been determined that primary band is available, the connection response message to the mobile station 200. If it has been determined that the primary band is not available, the base station 100 can transmit is the primary band change instruction message along with the connection response message in response to the connection request message.

Although it is depicted that the mobile station 200 establishes a initial connection with the base station 100 according to weight information determined by the base station 100 in the exemplary embodiments of FIGS. 3, 4, 6, and 7, the present invention is not limited thereto. For instance, when the mobile station 200 is established the initial connection with the base station 100, the mobile station 200 can reconnect to the base station 100 according to weight information determined by the base station 100. At this time, the base station 100 can transmit RRC packets including the weight information to the mobile station 200. If the RRC packets are received, the mobile station 200 can check the weight information carried in the RRC packets and reconnect to the base station 100 based on the weight information.

In the bandwidth aggregation system according to embodiments of the present invention, since the mobile station connects to the base station using a transmission bandwidth selected among multiple transmission bandwidths in consideration of the resource allocation distribution of the aggregated bandwidths, it is possible to mitigate the concentration of the resource allocation on a specific transmission bandwidth. That is, the transmission band determination method of the present invention is capable of maintaining the resource allocation distribution of the multiple bandwidths uniformly, thereby reducing the collision probability of the signals transmitted by multiple mobile stations and increasing connection success probability in the bandwidth aggregation system.

As described above, the bandwidth aggregation system and transmission band determination method thereof of the present invention allows a mobile station to select one of aggregated bandwidths for the connection to the base station in consideration of the resource allocation distribution of the aggregated bandwidths, thereby mitigating the concentration of the resource allocation on a specific bandwidth. Also, the bandwidth aggregation system and transmission band determination method of the present invention is capable of uniformly distributing the resource allocation over the aggregated bandwidths, thereby reducing the collision probability of the signals transmitted by multiple mobile stations and increasing connection success probability.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A bandwidth determination method of a base station for a bandwidth aggregation system supporting wideband communication by aggregating multiple bandwidths, comprising:
   computing weights of the multiple bandwidths based on resource allocation distributions of the individual bandwidths;
   selecting one of the multiple bandwidths based on the weights of the multiple bandwidths and establishing a connection with a mobile station using the selected bandwidth, and
   storing, in a memory, weight indices representing the weights in a weight vector table,
   wherein a controller retrieves the weight indices from the memory and transmits the weight indices to the mobile station by a transceiver.

2. The bandwidth determination method of claim 1, further comprising transmitting information on the weights of the multiple bandwidths from the base station to the mobile station through broadcast information or radio resource control packets.

3. The bandwidth determination method of claim 1, wherein the information is transmitted in the form of an analog signal.

4. The bandwidth determination method of claim 1, further comprising adjusting a size of a connection-allowable channel of each bandwidth for receiving a connection request transmitted by the mobile station according to the weight information.

5. A bandwidth determination method of a mobile station for a bandwidth aggregation system supporting transmission on multiple aggregated bandwidths, comprising:
   selecting one of the multiple bandwidths based on weight information indicating weights of the multiple bandwidths that are calculated based on resource allocation distributions of the individual bandwidths; and
   connecting to a base station through the selected bandwidth,
   wherein the base station stores, in a memory, weight indices representing the weights in a weight vector table, retrieves the weight indices from the memory, and transmits the weight indices to the mobile station.

6. The bandwidth determination method of claim 5, wherein the weight information is transmitted from the base station to the mobile station through broadcast information or radio resource control packets, the weight information being transmitted as an analog signal converted representing the weight indices.

7. A bandwidth determination apparatus of a base station for a bandwidth aggregation system supporting wideband communication by aggregating multiple bandwidths, comprising:
   a controller which computes weights of the multiple bandwidths based on resource allocation distributions of the individual bandwidths;
   a transceiver which establishes a connection with a mobile station using a bandwidth determined by the controller based on the weights of the multiple bandwidths, and
   a memory which stores weight indices representing the weights in a weight vector table, wherein the controller retrieves the weight indices from the memory and transmits the weight indices to the mobile station by the transceiver.

8. The bandwidth determination apparatus of claim 7, wherein the controller controls the transceiver to transmit the weight information through broadcast information or radio resource control packets.

9. The bandwidth determination apparatus of claim 7, wherein the controller converts the weight information to an analog signal and transmits the analog signal by the transceiver.

10. The bandwidth determination apparatus of claim 7, wherein the controller adjusts a size of a connection-allowable channel of each bandwidth for receiving a connection request transmitted by the mobile station according to the weight information.

11. A bandwidth determination apparatus of a mobile station for a bandwidth aggregation system supporting wideband communication by aggregating multiple bandwidths, comprising:
   a transceiver which receives weight information transmitted by a base station, the weight information representing weights calculated based on resource allocation distributions of the multiple bandwidths; and
   a controller which selects one of the multiple bandwidths based on the weight information and connects the mobile station to the base station through the selected bandwidth,
   wherein the base station stores, in a memory, weight indices representing the weights in a weight vector table, retrieves the weight indices from the memory, and transmits the weight indices to the mobile station.

12. The bandwidth determination apparatus of claim 11, further comprising a memory in the mobile station which stores the weight indices representing the weights in a weight vector table, wherein the controller checks the weight information with the weigh indices.

13. The bandwidth determination apparatus of claim 11, wherein the weight information is received in an analog signal, and the controller analyzes the analog signal to acquire the weight information.

* * * * *